Patented Jan. 2, 1945

2,366,219

UNITED STATES PATENT OFFICE 2,366,219

PRESSURE SENSITIVE RUBBER ADHESIVE

Frank J. Soday, Swarthmore, Pa., assignor to The United Gas Improvement Company, a corporation of Pennsylvania No Drawing. Application March 18, 1941, Serial No. 384,020

9 Claims. (Cl. 260—5)

This invention relates to adhesive or cementitious compositions comprising isoprene resin in admixture with one or more selected ingredients.

More particularly, this invention pertains to adhesive compositions adapted to form pressure-sensitive adhesive coatings, said compositions comprising isoprene resin and rubber dissolved or dispersed in a suitable liquid vehicle.

An object of the invention is to provide a normally tacky adhesive composition suitable for application to a wide variety of surfaces, such as those of paper, textiles, wood, cellulose and regenerated cellulose, cellulose derivatives, such as cellulose acetate, nitro cellulose, ethyl cellulose, and the like, resin and resin films, leather, glass, and the like, to form an adherent adhesive coating.

Another object of the invention is the provision of an adhesive tape, or other object, comprising a suitable backing, such as a strip of fabric or regenerated cellulose, having dispersed thereon an adhesive comprising a mixture of isoprene resin and rubber.

A further object of the invention is the provision of a transparent or translucent adhesive coating.

Another object of the invention is the provision of an adhesive comprising a mixture of isoprene resin, rubber, and certain fillers, such as zinc oxide, starch, and the like, suitable for use in the preparation of surgical adhesives.

Other objects, including the provision of a simple and economical method of producing adhesives of the stated type, will be apparent to those familiar with the art from a consideration of the specification and claims.

Adhesives comprising mixtures of rosin or ester gum with rubber are well known in the art. However, such adhesive mixtures suffer from numerous disadvantages, particularly from the standpoint of those applications in which either light color, stability, good aging properties, transparency, and/or uniformity are important factors.

Thus in adhesive compositions comprising mixtures of wood rosin with rubber, small crystals of rosin will slowly form and increase in size upon standing for any length of time, resulting in a very considerable reduction in the tacky properties of the adhesive.

In adhesive compositions comprising mixtures of gum rosin with rubber, on the other hand, crystallization of the rosin upon standing does not occur to any appreciable extent, but the rubber deteriorates at an unusually rapid rate, resulting in a corresponding decrease in the cohesiveness, or firmness, of the adhesive.

The main objection to the use of rosin, or modified types of rosin such as ester gum, or rosin ester, in adhesive compositions is the accelerating effect of such resins upon the aging of the rubber present in the adhesive. As a result, adhesives containing rosin, or a rosin derivative, become brittle upon standing for appreciable periods of time, resulting in a very serious reduction in the elastic and cohesive properties of such adhesives. As pointed out previously, gum rosin has a particularly pronounced accelerating action upon the rate of degradation of the rubber in adhesive mixtures.

In addition, the use of rosin in adhesive mixtures suffers from the added disadvantage that it is a material of quite variable composition, its properties depending largely upon the source, method of isolation and refining, and the climatic conditions prevailing at the time at which it is collected or prepared. This applies also to derivatives prepared from rosin, such as rosin ester, ester gum, and similar materials. As a result, adhesives prepared from rosin or rosin derivatives are of variable quality.

Rosin and rosin derivatives usually are somewhat dark in color, consequently adhesives prepared from these materials are generally dark in color and lacking in transparency.

Finally, certain persons are definitely allergic to adhesive compositions containing rosin or rosin derivatives, developing certain pathological skin conditions when brought in contact with such adhesives.

I have found that adhesives possessing unusually desirable characteristics may be prepared by blending isoprene resin with rubber. Certain other ingredients, such as zinc oxide, starch, pigments, coloring agents, dyes, lakes, fillers, antioxidants, inhibitors, stabilizers, solvents, plasticizing agents, and the like, also may be incorporated in the isoprene resin-rubber mixture if desired.

The use of isoprene resin in the formulation of adhesives and cements offers the following advantages.

(1) Isoprene resin possesses certain unique adhesive properties. Thus, adhesives prepared from isoprene resin possess more pronounced adhesive properties than corresponding adhesives prepared from rosin or rosin derivatives.

(2) Isoprene resin is hydrocarbon in nature. Consequently, it is completely inert and does not accelerate the aging of the rubber present in adhesive mixtures.

(3) Isoprene resin is compatible with rubber in all proportions.

(4) Isoprene resin is hydrocarbon in nature, consequently it is completely insoluble in water and imparts excellent water-proofing properties to adhesives in which it is an ingredient.

(5) Isoprene resin is a synthetic product, consequently its composition can be controlled within very narrow limits. This property permits the preparation of adhesives possessing desired characteristics at will.

(6) Isoprene resin can be obtained in colors ranging from water-white to deep yellow in hue at will. Consequently adhesives possessing extremely light colors, and good transparency, can be obtained by the use of isoprene resins.

(7) Isoprene resin is completely inert in character, consequently adhesives prepared from it are incapable of causing any undesirable pathological changes in the epidermis.

Illustrative of the isoprene resins which may be combined with rubber to form adhesives possessing unusually desirable characteristics are those described in my copending application Serial No. 352,120, filed August 10, 1940.

Although isoprene resins possessing any desired melting point such as above, below, or at room temperature may be used in the preparation of adhesives, I prefer to use isoprene resins having melting points above room temperature for this purpose. In particular, isoprene resins having melting points above 60° C., as determined by the A. S. T. M. Ball and Ring melting point method, are quite satisfactory for the preparation of adhesives for this purpose. Excellent results are obtained when isoprene resins having melting points in the range of 70 to 110° C. are employed. The tacky properties of the resulting adhesive mixture may, in general, be increased and decreased as desired, by decrease and increase respectively in the melting point of the isoprene resin employed.

While I prefer to use isoprene resin as the only resinous ingredient in the preparation of adhesives of the type described, it is to be understood that other resins also may be employed in conjunction with isoprene resin, if desired. Examples of such resins are other hydrocarbon resins, ester gum, rosin ester, rosin, and the like, although the latter are open to the objections set forth above.

As pointed out in the copending application previously referred to, the polymerization of isoprene under carefully controlled conditions results in the production of resinous polymers possessing a number of outstanding properties. Among these unique characteristics are the pronounced adhesive properties of the resins and their possession of certain elastic characteristics. This latter property is manifested by the unusual flexibility of the isoprene resins, as shown by their ability to resist severe distortion and mechanical abrasion and stresses when used as a coating material in certain applications.

Other desirable properties of these resins are their comparatively light colors, and the ease with which their softening points may be varied by suitable changes in the polymerizing process employed, as will be more fully explained hereinafter.

These resinous products differ from synthetic rubber in that they possess a definite and reproducible softening point, and are compatible with drying oils. In addition, they cannot be vulcanized by any of the methods usually employed for this purpose in the rubber industry.

This invention is concerned with the preparation of adhesives from resinous isoprene polymers and rubber.

The resinous polymers employed in the preparation of adhesives in accordance with the present invention may result from the polymerization of isoprene alone, or in the presence of other unsaturated and/or reactive hydrocarbon materials, such resinous polymers being referred to herein as isoprene resins.

Any suitable method, such as one employing an appropriate catalyst, may be used in the preparation of the resinous polymers.

Generally, an isoprene resin will be selected which contains little or no polymerized material insoluble in the usual hydrocarbon solvents and, while insoluble polymers may be separated from the desirable soluble polymers, such a separation represents an economic loss. Hence, a process is preferably employed in the preparation of the isoprene resin which does not result in the formation of an appreciable amount of the insoluble type of polymers.

Furthermore, in certain instances, particularly in the polymerization of pure isoprene, resins having some rubber-like characteristics may be produced. Such materials can be used to a limited extent in the production of the adhesives described herein, but the use of true resinous polymers is more advantageous.

Generally speaking when the starting material is pure isoprene and when a metallic halide catalyst is employed, the resulting resinous polymer has a substantially elevated softening point, that is, above 60° C.

The same is true when certain selected olefines are present.

This does not always hold true, however, in the case of olefines which normally occur in the presence of isoprene in hydrocarbon fractions resulting from the pyrolytic decomposition of petroleum oil such as takes place, for instance, in the manufacture of oil gas, carburetted water gas, or in the manufacture of motor fuels.

In such instances the character of the olefines present, even though reduced to as low as 5% of the unsaturates present, may be such as to result in the production of resinous polymers which are liquid at ordinary temperatures.

Very satisfactory resins for use in the preparation of adhesives of the type described may be obtained when isoprene is polymerized with certain selected olefines, particularly aliphatic olefines, or when isoprene is polymerized in the presence of benzene, toluene, xylene, or high boiling aromatic hydrocarbons, either with or without the addition of olefine hydrocarbons, using a metallic halide such as aluminum chloride as a catalyst. When aromatic hydrocarbons are present during polymerization, the quantity which takes part in the reaction and becomes a part of the resin usually is less than 5% of the resin, the rest, if any, acting for the most part as diluent.

Other diolefines, in addition to isoprene, such as butadiene and piperylene, may be present if desired, in which event the isoprene preferably comprises at least the major portion of the diolefine content, and usually preferably comprises 90% or more of the total diolefines present; but satisfactory resins for the preparation of adhesives of the type described have been obtained using a mixture of diolefines where the isoprene content was 75% or less, based on the total diolefine content.

In general, when forming the resins, the unsaturated hydrocarbons, as distinguished from aromatics, usually comprise from 10% to 80%, by weight of the total material present, the ratio of isoprene to other unsaturated hydrocarbons being from 40% to 100% by weight.

The polymerization is advantageously carried out in the presence of a halide-containing catalyst, such as a metallic halide, metallic halide-organic solvent complex, ansolvo acid, and the like, the quantity of catalyst usually ranging from 0.1% to 5.0% by weight of the total unsaturated and reactive compounds present.

The temperature may advantageously range from −60° C. to +60° C. and the time of reaction may vary, for example, from one to ten hours.

Although I have particularly set forth convenient and preferred methods of forming the isoprene resin to be used in the formulation of the adhesives and cements of the type described herein, particularly when other unsaturated and/or reactive hydrocarbons are present with the isoprene during the polymerization, it is to be understood that broadly speaking, the isoprene resin may be derived from any source, particularly if its softening point is above atmospheric temperatures and especially when its softening point is above 60° C.

An important commercial source of isoprene is the light oil previously referred to as obtained as the result of pyrolysis of petroleum or petroleum hydrocarbons. In particular, the light oil obtained as a by-product in the manufacture of oil gas or carburetted water gas is an especially important source of this material.

However, as pointed out above, ordinary polymerizing methods may lead to the production of liquid polymers or mixtures of liquid polymers and insoluble polymers when these methods are applied to the polymerization of light oil isoprene fractions.

This is especially true when the catalysts used include boron trifluoride-organic solvent complexes, tin tetrachloride, aluminum chloride, aluminum chloride-organic solvent complexes, maleic anhydride, zinc chloride, titanium tetrachloride, phosphorus pentachloride, antimony trichloride, antimony trifluoride, sulfuryl chloride, sulfur dioxide, ferric chloride, and mixtures of certain of these catalysts, and the temperature employed is much above room temperature.

As a result of extensive experimentation, I have discovered that highly satisfactory solid, resinous polymers may be produced upon polymerization of light oil isoprene fractions, with or without the presence of added aromatic hydrocarbons, by means of boron trifluoride as catalyst as distinguished from all other catalysts of this type and complexes thereof and including complexes of boron trifluoride itself, provided the polymerizing temperature throughout the reaction is held below −20° C. This process is described and claimed in my copending application Serial Number 352,119 filed August 10, 1940. The resins obtained in this manner have been found to be eminently suited for the preparation of the adhesives and cements of the type described herein.

Very little, if any, of the insoluble type of polymer is obtained in this process.

Fractions containing almost any desired proportion and concentration of isoprene and other unsaturated hydrocarbons may be obtained by the fractionation of light oil obtained from oil gas or carburetted water gas.

In addition, various other methods may be used for obtaining the selected ratio and/or concentration of isoprene and olefines in such fractions. For example, if the proportion of isoprene in any given fraction is too high to permit the production of a resin having the desired characteristics, a portion of the isoprene may be removed prior to polymerization, such as by treating the solution with a suitable quantity of cuprous chloride, followed by filtration to remove the isoprene-cuprous chloride complex formed.

An alternative method of increasing or decreasing the relative proportions of any of the components at will comprises blending a given fraction with a fraction rich in the desired component or components, or with the desired component in a pure or relatively pure form. For example, the substantially pure isoprene obtained by decomposing the isoprene-cuprous chloride complex previously referred to, such as by the application of heat, may be added to a second fraction deficient in isoprene.

The isoprene preferably comprises 90% or more of the total diolefines present, although highly satisfactory resins have been obtained when using a mixture of diolefines in which the isoprene content was 75%, or less, based on the total diolefine content, said mixture also containing olefines.

Although light oil fractions containing any desired concentration of isoprene may be used, I have found that fractions containing from 40% to 98% isoprene give especially good results. The exact concentration and ratio of the isoprene and olefines present in any particular fraction depends, among other things, upon the cracking operations under which the light oil was produced, as well as upon the extent to which the light oil has been fractionated. Fractions possessing a higher isoprene concentration and a higher ratio of isoprene to olefines may be obtained by efficiently fractionating a given sample of light oil, such as by the use of a fractionating column possessing a large number of theoretical plates in conjunction with the use of a relatively large reflux ratio.

It is apparent that light oil fractions containing any desired concentrations of unsaturated hydrocarbons, as well as any desired ratio of diolefines to olefines, can be obtained by the use of the foregoing methods, either alone or in combination.

The most important variables in the conversion of light oil isoprene fractions to soluble solid resinous polymers are (1) concentration of unsaturated hydrocarbons, (2) proportion of catalyst used, (3) temperature, (4) ratio of isoprene to olefines or other reactive compounds, (5) time of contact, and (6) the specific procedure employed in contacting the reactants.

With respect to the concentration of unsaturated hydrocarbons present in the reaction mixture, it has been found that the addition of limited quantities of an aliphatic or aromatic solvent to the isoprene fraction is desirable, particularly when the original isoprene fraction contains an unusually high proportion of unsaturated hydrocarbons (olefines and diolefines). This provides a dispersion medium for the catalyst during the polymerizing reaction, and prevents the reaction mixture from solidifying during the later stages of the polymerizing reaction. In addition, the diluted resin solutions so obtained can be more readily hydrolyzed during the subsequent treatment to remove the catalyst.

In this connection, it is well to point out that the use of certain solvents to reduce the concentration of unsaturated hydrocarbons present in the reaction mixture may affect the nature or yield of the resinous polymer subsequently obtained. For example, the use of benzene, toluene or higher boiling aromatic hydrocarbons for this purpose may result in the production of resinous polymers having chemically combined a substantial quantity of benzene, toluene or other aromatic hydrocarbon residues. In general, the resins obtained in this manner possess very desirable characteristics.

The quantity of catalyst used and the manner in which it is added to the reaction mixture has a considerable influence upon the nature and yield of the polymer obtained. There appears to be a certain minimum concentration of catalyst below which polymerization does not take place. While this quantity varies somewhat with the specific light oil fraction used, it may be stated that very little, if any, polymerization occurs when less than 0.1% of boron trifluoride, based on the total unsaturated hydrocarbon present, is used.

The catalyst is preferably added in small increments in order to maintain the temperature of the reaction mixture at a reasonably constant level. The addition of large quantities of catalyst during very short periods of time usually results in sudden temperature surges which may raise the temperature of the reaction mixture to undesirable levels.

The molecular weight, and hence the softening point of the resinous material may be varied over a considerable range by controlling the polymerizing temperature. Generally speaking, the use of temperatures considerably below —20° C. results in the production of resinous polymers having relatively high softening points and, conversely, the use of polymerizing temperatures approaching —20° C. results in resinous polymers having relatively lower softening points. Excellent results are obtained when polymerizing temperatures in the range of —30° C. to —70° C. are employed.

The ratio of isoprene to olefines and/or other reactive compounds present in the starting material has a considerable influence upon the physical properties of the product obtained. Thus, in general, an increase in the ratio of the olefines and/or the other reactive materials to isoprene results in a corresponding reduction in the softening point of the resinous polymers subsequently obtained. Conversely, an increase in the ratio of isoprene to other unsaturated hydrocarbons results in the production of resinous polymers having relatively high softening points The molecular weight, and, hence, the softening point, of the resin can be varied within fairly wide limits by suitable variations in the polymerizing time employed. In general, and with all other conditions unchanged, an increase in the polymerizing time results in an increase in the softening point of the isoprene resin. This is an important consideration, as it permits resins having different softening points to be prepared from the same isoprene fraction.

A convenient method of preparing a series of isoprene resins having different softening points comprises polymerizing the desired isoprene fraction and removing suitable portions of the polymerized material from the reaction vessel at definite intervals of time, followed by the neutralization and hydrolysis of the respective samples after removal from the reaction vessel. In this way, a series of resins having increasing melting points will be obtained.

The specific procedure employed in contacting the reactants also exerts a considerable influence upon the properties of the resin subsequently obtained. For example, the use of the batch process for the polymerization of isoprene, particularly when the catalyst is added in several small portions to the reaction mixture during the course of the reaction, results in the production of polymers having relatively high melting points. On the other hand, the polymerization of isoprene in a continuous system, either concurrent or countercurrent in nature, usually results in the production of resins having somewhat lower melting points.

In general, when using the polymerizing process of my above mentioned co-pending application, the following may be said to be reasonable preferred limits for the reaction variables previously discussed: (1) total concentration of unsaturated hydrocarbons: 10% to 80% by weight, (2) quantity of boron trifluoride catalyst: 0.1% to 5.0% by weight of the total unsaturated and reactive compounds present, (3) temperature: —70° C. to —20° C., (4) ratio of isoprene to other unsaturated aliphatic compounds (olefines and diolefines) from 40% to 98% by weight, and (5) reaction time, up to 48 hours.

The polymerization of isoprene fractions to form resinous polymers of the desired type is illustrated by the following example.

*Example 1*

A 54.7 gram portion of a light oil isoprene fraction containing 85.6% by weight of isoprene, 8.2% by weight of amylenes, and 6.2% by weight of pentanes was placed in a one liter flask and immersed in a cooling bath. Approximately 164 grams of toluene was added to the same flask, after which the temperature of the mixture was reduced to —60° C. Small portions of gaseous boron trifluoride were passed into the reaction flask at five minute intervals until a total of three additions had been made. During this period, the temperature of the reaction mixture increased to —40° C. Additional quantities of gaseous boron trifluoride then were passed into the reaction mixture at 40 minute intervals during a period of 2 hours, the temperature being maintained at —60° C.

The mixture was maintained at this temperature for an additional period of 45 minutes, after which the temperature was permitted to rise to +10° C. in order to remove the major portion of the boron trifluoride present. The remainder of the catalyst was hydrolyzed by the addition of 15 cc. of ethyl alcohol, followed by the addition of 5 cc. of water after a period of ten minutes. At this point, 25 grams of calcium oxide were added to the mixture, after which the mixture was agitated for a period of one half hour and filtered. The unpolymerized material then was removed by distillation under reduced pressure.

Approximately 57.1 grams of a brittle, light yellow colored resin were obtained. The resinous product was completely soluble in the usual hydrocarbon solvents and had a melting point of 100° C. as determined by the standard A. S. T. M. Ball and Ring melting point method. It was completely compatible with the usual drying oils.

The rubber used in conjunction with isoprene resin for the preparation of adhesives and cements may be of any desired type. Crude rubber, such as raw plantation crepe, artificially coagulated latex, such as raw latex crepe, Pará rubber, smoked latex sheet, sprayed rubber, vulcanized rubber such as that commonly employed for toilet articles, tires and the like, reclaimed rubber, and the like may be used, as well as the so-called synthetic rubbers or elastomers, such as those obtained by the polymerization by processes producing rubber polymers of butadiene, isoprene, piperylene, isobutylene, and halogenated derivatives of these hydrocarbons, such as 2-chloro-butadiene-1,3, either alone or in admixture with each other or with other reactive materials, such as styrene, styrene homologues, acrylic nitrile, or related compounds. Suitable mixtures of natural and/or synthetic rubbers also may be used if desired.

Although such materials may be used without further processing for the preparation of isoprene adhesives and cements, I generally find it advisable to reduce their molecular weight by suitable methods, such as by milling or other mechanical working methods. This can be carried out in any desired manner, such as by milling the rubber alone or in admixture with other additives, such as solvents, softeners, plasticizing agents, inhibitors, antioxidants, stabilizing agents, pigments, fillers, extenders, coloring agents, dyes, and the like. The milling also may be carried out in the presence of the isoprene resin, if desired.

Preferably, care is taken to mill the rubber to a desired extent, and to control the milling temperature within desired limits. Rubber, in general, imparts cohesiveness (firmness) to the adhesive, while the isoprene resin imparts tack to the adhesive mixture. As pointed out previously, isoprene resin also imparts a certain amount of cohesiveness and elasticity to the finished resin, being unique among resins normally employed for this purpose in this respect.

Milling rubber increases its adhesiveness and decreases its cohesiveness, or body. Consequently, to obtain a material with limited body extended milling is employed.

The ratio of isoprene resin to rubber in the composition has a profound effect upon the properties of the resulting adhesive. In general, the use of fairly low proportions of isoprene resin results in the production of adhesives possessing limited tack but very pronounced cohesiveness. Conversely, the use of high proportions of isoprene resin results in the production of adhesives possessing outstanding tacky properties but considerably reduced cohesiveness.

As pointed out previously, the properties of the resulting adhesive also is profoundly affected by the extent to which the rubber has been milled prior to its incorporation in the adhesive mixture. Thus, the greater the milling the less isoprene resin will be required to impart a given tack to the adhesive.

I have found that highly satisfactory adhesives may be obtained when the proportion of isoprene resin employed varies from 5% to 95% by weight of the rubber present in the formulation, and that particularly desirable results are obtained when the proportion of isoprene resin employed amounts to 20% to 80% by weight of the rubber present. Excellent results are obtained when from 30% to 70% of the isoprene resin-rubber mixture comprises isoprene resin.

In many cases, it is desired to apply the adhesive to the surface in solution form, such as by spreading, flowing, brushing, spraying, dipping, or the like. For this purpose, the adhesive may be dissolved or dispersed in a suitable solvent, examples of which are the aromatic hydrocarbons, such as benzene, toluene, and xylene, petroleum fractions, such as Stoddard solvent, mineral spirits, and V. M. & P. naphtha, and coal tar fractions or distillates such as solvent naphtha, and the like. The viscosity of the solution may be varied at will by a suitable choice of the type and quantity of solvent employed.

The viscosity of the solution or dispersion also may be reduced, if desired, by the incorporation of certain viscosity-reducing substances in the mixture, such as methyl alcohol or ethyl alcohol.

For certain applications, particularly those in which the adhesive is permitted to stand, or is exposed to the atmosphere, for relatively long periods of time prior to final application, the incorporation of certain antioxidants or stabilizing agents in the adhesive composition is desirable in order to retain the tacky and cohesive properties of the adhesive unimpaired. Examples of agents of this type which have been found to be particularly effective are secondary amines, such as diphenyl-p-phenylene diamine, phenyl beta naphthylamine, isopropoxydiphenylamine, aldol alpha naphthylamine (and polymers thereof), symmetrical di beta naphthyl-para-phenylenediamine, trimethyl dihydroquinoline (and polymers thereof), and the ditolylamines. Mixtures of certain of these secondary aryl amines also are excellent inhibiting agents for this purpose. Included among the mixtures which have been found particularly desirable are the commercial products known as "Age-Rite Exel," which is a mixture of isopropoxydiphenylamine and diphenyl-p-phenylenediamine, "Age Rite Hipar," which is a mixture of phenyl beta naphthylamine, isopropoxydiphenylamine, and diphenyl-p-phenylenediamine, and "Age-Rite HP," which is a mixture of phenyl beta naphthylamine and diphenyl-p-phenylenediamine.

Other commercial products which have been found to be satisfactory for this purpose include "Flectol H," which is a solid condensation product of aniline and acetone, "Flectol B," which is a liquid condensation product of the same type, "Solux" (p-hydroxy-n-phenylmorpholine), "Age-Rite Resin" (aldol-α-naphthylamine reaction product), and "Antox" (beta naphthol).

Although any desired quantity of such antioxidants, or mixtures of antioxidants, may be added to adhesives of the type described, I prefer to add from 0.1 to 5.0% by weight, based on the quantity of rubber present in said adhesive. As the majority of these antioxidants are soluble in the solvents normally employed in the preparation of adhesives of the type described, they may be dissolved in the solvent prior to, during, or after the addition of the solvent to the adhesive. Otherwise, they may be milled into the rubber during the milling operation, or otherwise.

As pointed out previously, certain fillers also may be added to the isoprene resin-rubber adhesives which are to be used for certain specific applications. Thus, zinc oxide, starch, and similar materials may be added to isoprene resin-rubber adhesives which are to be used for the manufacture of surgical tape and similar materials. For other applications, coloring agents, such as paratoluidine red may be added, as well as pigments such as carbon black and gold bronzing powder. These additives may be incorporated in the adhesive in any suitable manner, such as by addition during the preliminary milling operation.

Certain plasticizing agents also may be incorporated in the isoprene resin-rubber adhesives, if desired. In general, these are added to serve at least two purposes, namely, to facilitate the calendering or milling of the rubber and to modify the tack and other properties of the resulting adhesive mixture. With respect to the latter object, two different types of plasticizing agents have been developed, namely, those which serve to increase the tacky properties of the adhesive mixture and those which serve to reduce these properties. An example of a plasticizing agent which will reduce the tacky nature of the adhesive mixture is lanolin, while dibutyl phthalate is an example of a plasticizing agent which will increase the tacky nature of the adhesive.

The isoprene resin-rubber adhesives of the type disclosed herein generally are of the normally tacky and pressure-sensitive type. That is, they do not need to be activated by heat or solvents, or otherwise, in order to exert an adhesive action. In case the adhesive is in the form of a solution or dispersion in a suitable solvent, the adhesive coating formed upon evaporation of the vehicle usually is tacky and pressure-sensitive.

By applying the adhesive to relatively smooth impermeable surfaces not having a special bonding action, an adhesive coating is formed which may be stripped off subsequently, if desired.

The adhesive composition may be spread upon a suitable backing, such as that of fabric, cellulose, cellulose derivatives, regenerated cellulose, paper, and the like, to form a stable tacky adhesive coating. This backing may be pressed subsequently against a surface to which it is desired to attach the backing. An immediate and complete adhesion of the two surfaces is secured without waiting for any drying or setting action. The backing may be stripped subsequently from the second surface without leaving any substantial quantity of adhesive upon the second surface, if desired, particularly in those cases in which the adhesive coating has been applied to the backing in the form of a solution or dispersion in a suitable solvent, as the adhesive coating is more firmly attached to the surface to which it was applied in dispersed form, and the final adhesive possesses greater internal cohesiveness than external adhesiveness.

By the use of suitable isoprene resin-rubber adhesives, either with or without the use of certain additives as hereinbefore set forth, a wide variety of industrial, surgical, and other types of tape may be prepared. For example, the application of an isoprene resin-rubber adhesive prepared from a light colored or colorless isoprene resin and milled plantation crepe or raw latex crepe to a colorless backing, such as one prepared from certain colorless plastics, cellulose, or regenerated cellulose, leads to the production of the so-called transparent tapes.

In using my adhesive to join together two or more surfaces, none of which have been coated previously with the adhesive, use may be made of such adhesives in the form of solutions or dispersions in suitable solvents or vehicles or the adhesive may be applied in a solvent-free form. In the former case, the adhesive solution or dispersion usually is applied to the surfaces to be joined in the form of a thin coating, after which the vehicle is permitted to evaporate. The surfaces subsequently are pressed together, resulting in an immediate and complete adhesion of the said surfaces.

The solvent-free adhesive also may be used to join two or more surfaces by applying the adhesive to the surfaces to be joined, such as by application by means of suitable rolls or by other mechanical means, followed by pressing such surfaces together. An immediate and complete adhesion of such surfaces is at once attained.

Due to the excellent water resisting properties of my adhesive, it is especially suited for certain applications in which the object coated is to be subjected to moist or wet atmospheric conditions. Thus, for example, my adhesive is especially well adapted to join wood, paper, cloth, or other fabric surfaces to form plywood, cardboard, laminated paper or fabric, and cardboard containers, such as multi-ply paper cartons, drums, shipping containers, and the like.

Multi-ply containers of this type usually are fabricated by rolling a continuous sheet containing a suitable adhesive over a form of the desired shape until the desired thickness is attained, followed by the application of a water-proofing agent or composition to the outer seam. By the use of isoprene resin-rubber adhesives of the type described, a container possessing greatly improved water resistance is obtained without the necessity of applying a water-proofing agent to the external seam, thus resulting in a substantial reduction in the cost of fabricating such containers.

The preparation and use of adhesives of the type described are illustrated by means of the following examples.

*Example 2*

A mixture of 100 parts of milled reclaimed rubber and 100 parts of isoprene resin having a melting point of 70° C., as measured by means of the standard A. S. T. M. Ball and Ring melting point method, is dispersed in 1200 parts of petroleum naphtha in a suitable mixing unit. Two parts "Age-Rite Exel" then is thoroughly incorporated in the adhesive dispersion.

Upon applying a portion of this dispersion to a strip of paper, and permitting the vehicle to evaporate, a tacky and pressure-sensitive adhesive coating is formed on the paper. By applying suitable sections of the coated paper to a second surface, such as that of wood, paper, or fabric, the said surfaces are readily joined together. An especially durable joint is secured when a coated section of the paper is applied to a second coated section with the coated surfaces adjacent to each other.

*Example 3*

A mixture of 75 parts of milled rubber, 25 parts of an elastomer obtained by the polymerization of isobutylene with gaseous boron trifluoride at low temperatures, 60 parts of an isoprene resin having a melting point of 60° C. as determined by the standard A. S. T. M. Ball and Ring method, and 60 parts of zinc oxide is dispersed in 800 parts of naphtha in a suitable mixing unit. One part of "Age-Rite Hipar" then is thoroughly incorporated in the adhesive dispersion.

A portion of this dispersion was placed on a narrow strip of fabric, after which the vehicle was permitted to evaporate. The resulting adhesive tape could be readily affixed to any desired surface.

In the specification and in the claims the term

"rubber" is intended to include both natural and synthetic rubber, and mixtures thereof in the unvulcanized or vulcanized state. The term excludes hard rubber, such as ebonite as such.

By synthetic rubber is meant, in the unvulcanized or vulcanized state, the so-called synthetic rubbers or elastomers obtained by the polymerization by processes adapted to produce rubber-like polymers of butadiene, isoprene, piperylene, isobutylene and halogenated derivatives of these hydrocarbons either alone or in admixture with each other or with styrene, styrene homologues, or acrylic nitrile, to produce rubber-like substances. The term likewise excludes hard rubber as such.

The term natural rubber is well known in the art, and includes both the unvulcanized and vulcanized forms. The term so-used does not include hard rubber, such as ebonite as such, although the hard rubbers, whether natural or synthetic, might possibly be milled or otherwise reduced in molecular weight in which form they are no longer hard rubbers and might be used.

It is to be understood that the foregoing specific examples are given by way of illustration only, and that changes, omissions, additions, substitutions and/or modifications may be made within the scope of the claims without departing from the spirit of the invention.

I claim:

1. An adhesive composition suitable to form highly coherent, tacky, and pressure-sensitive coatings comprising a mixture of isoprene resin and rubber; said isoprene resin characterized by having a definite and reproducible softening point and by being compatible with drying oils, and having been prepared by polymerizing a hydrocarbon mixture including isoprene as the major diolefine present in the presence of boron trifluoride as catalyst under conditions such that (1) the total concentration of unsaturated hydrocarbons is between approximately 10% and 80% by weight of the mixture; (2) the quantity of catalyst is between approximately 0.1% and 5.0% by weight of the total unsaturated and reactive compounds present; (3) the temperature is between approximately −70° C. and −20° C.; and (4) the ratio of isoprene to other unsaturated aliphatic compounds, including olefines and diolefines, is from approximately 40% to 98% by weight.

2. A process for making adhesive tape having a highly coherent, tacky, and pressure-sensitive coating comprising preparing an isoprene resin characterized by having a definite and reproducible softening point and by being compatible with drying oils, by subjecting a hydrocarbon mixture including isoprene as the major diolefine present to polymerization in the presence of boron trifluoride as a catalyst under conditions such that (1) the total concentration of unsaturated hydrocarbons is between approximately 10% and 80% by weight of the mixture; (2) the quantity of catalyst is between approximately 0.1% and 5.0% by weight of the total unsaturated and reactive compounds present; (3) the temperature is between approximately −70° C. and −20° C.; and (4) the ratio of isoprene to other unsaturated aliphatic compounds, including olefines and diolefines, is from approximately 40% to 98% by weight; admixing the isoprene resin thus prepared with rubber, and coating a suitable backing with the resulting mixture.

3. A highly tacky, pressure-sensitive adhesive comprising isoprene resin which is compatible with drying oils and has a definite and reproducible softening point, and rubber, said isoprene resin having a relatively high solubility in rubber and resulting from the polymerization of a diolefinic material in which isoprene is at least the major diolefine present, said isoprene resin being present in an amount equivalent to 20% to 80% by weight of said rubber.

4. An adhesive composition suitable to form highly coherent, tacky, and pressure-sensitive coatings comprising a mixture of isoprene resin which is compatible with drying oil and has a definite and reproducible softening point, and milled rubber dispersed in a volatile vehicle, said isoprene resin being present in the composition in amount equivalent to 20% to 80% by weight of said rubber and said isoprene resin having a relatively high solubility in rubber and resulting from the polymerization of a diolefinic material in which isoprene is at least the major diolefine present.

5. An adhesive tape comprising a suitable backing coated with a coherent, tacky, pressure-sensitive adhesive comprising an admixture of isoprene resin which is compatible with drying oils and has a definite and reproducible softening point, and milled rubber, said isoprene resin being present in an amount equivalent to 20% to 80% by weight of said rubber and said isoprene resin having a relatively high solubility in rubber and resulting from the polymerization of a diolefinic material in which isoprene is at least the major diolefine present.

6. A highly tacky pressure-sensitive adhesive comprising isoprene resin which is compatible with drying oils and has a definite and reproducible softening point, and rubber, said isoprene resin having a relatively high solubility in rubber and resulting from the polymerization of a diolefinic material in which isoprene is at least the major diolefine present, said isoprene resin being present in an amount equivalent to 5% to 95% by weight of said rubber.

7. A highly tacky pressure-sensitive adhesive comprising isoprene resin which is compatible with drying oils and has a definite and reproducible softening point, and rubber, said isoprene resin having a relatively high solubility in rubber and resulting from the polymerization of a diolefinic material in which isoprene comprises at least 75% of the diolefine content thereof, said isoprene resin being present in an amount equivalent to 30% to 70% by weight of said rubber.

8. A highly tacky pressure-sensitive adhesive comprising isoprene resin which is compatible with drying oils and has a definite and reproducible softening point, an antioxidant, and rubber, said isoprene resin having a relatively high solubility in rubber and resulting from the polymerization of a diolefinic material having isoprene as at least 90% of the diolefinic content thereof, said isoprene resin being present in an amount equivalent to 5 to 95% by weight of said rubber and said antioxidant being present in amount equivalent to 0.1% to 5.0% by weight of said rubber.

9. Cloth coated with the composition of claim 3.

FRANK J. SODAY.